United States Patent [19]

Latapie

[11] 4,388,902

[45] Jun. 21, 1983

[54] IGNITION TIMING DEVICE AVOIDING PINGING DURING THE FUNCTIONING OF AN INTERNAL COMBUSTION ENGINE

[75] Inventor: Jean-Francois Latapie, Roquettes, France

[73] Assignee: Societe pour l'Equipement de Vehicules, Issy-les-Moulineaux, France

[21] Appl. No.: 218,309

[22] Filed: Dec. 19, 1980

[30] Foreign Application Priority Data

Dec. 20, 1979 [FR] France ................................ 79 31281

[51] Int. Cl.³ .............................................. F02P 5/04
[52] U.S. Cl. ........................................ 123/425; 73/35
[58] Field of Search ....................... 123/425, 416, 417; 73/35

[56] References Cited

U.S. PATENT DOCUMENTS

| | | | |
|---|---|---|---|
| 4,116,173 | 9/1978 | McDougal et al. | 123/425 |
| 4,243,007 | 1/1981 | Ehrhardt et al. | 123/425 X |
| 4,269,155 | 5/1981 | Iwata et al. | 123/425 |
| 4,282,841 | 8/1981 | Takagi et al. | 123/425 |
| 4,289,102 | 9/1981 | Katsumato et al. | 123/425 |
| 4,300,503 | 11/1981 | Deleris et al. | 123/425 |
| 4,331,117 | 5/1982 | Ginsburgh | 123/425 |

*Primary Examiner*—Tony M. Argenbright
*Attorney, Agent, or Firm*—Brisebois & Kruger

[57] ABSTRACT

A device for controlling ignition timing in an internal combustion engine includes a vibration detector responsive to engine vibrations, and comparison means for determining when the output signal of the vibration detector exceeds a base noise output value for that particular cylinder, stored during a previous cycle. The operation of the vibration detector and the comparison means is controlled in response to angular position of the crank shaft so that the base noise value and the detected noise value for each individual cylinder can be determined separately, by defining a given angular position window during which pinging or pre-ignition is likely to occur on any given cylinder. On the basis of the comparison thus effected, the normal ignition advance signal is either unaffected (because no pinging has occurred) or subject to an ignition retardation component (when pinging has occurred) in order to relieve that given cylinder of pinging. Preferably the ignition timing is controlled to have a different value for each cylinder to allow for the possibility of one cylinder being subject to pinging when the others are not.

9 Claims, 2 Drawing Figures

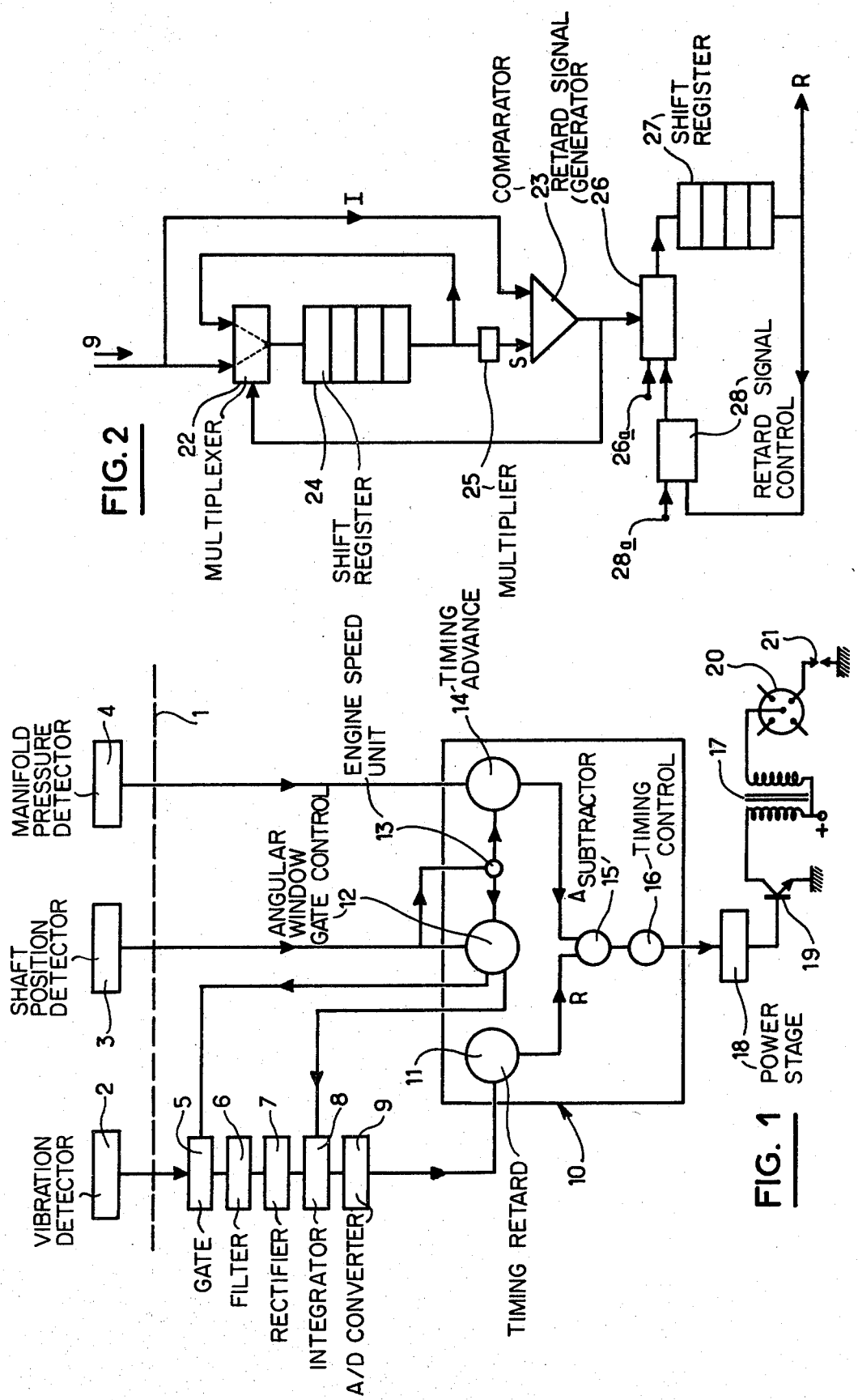

IGNITION TIMING DEVICE AVOIDING PINGING DURING THE FUNCTIONING OF AN INTERNAL COMBUSTION ENGINE

DESCRIPTION

The present invention relates to an ignition timing device for an internal combustion engine, especially for a motor vehicle, this device being associated both with a vibration detector responsive to the occurrence of pinging in a cylinder (i.e. preignition causing premature detonation of the fuel/air change in that cylinder) and with an electronic circuit which controls the ignition advance in accordance with the signals of this detector.

There has already been described, for instance in the French Patent Application 79-00749, an ignition timing device comprising in association with a conventional device allowing ignition timing advance to be obtained according to the engine speed of rotation, a circuit by means of which it is possible to impose an ignition delay on appearance of pinging, irrespective of the engine speed of rotation. This ignition timing delay is superimposed on the conventional ignition timing advance of any given point of the advance curve and makes it possible to cause the pinging to disappear. The appearance of pinging may be detected by a vibration detector or an accelerometer fixed to the engine block since, when pinging occurs, the level of the vibrations received by the detector is considerably higher than in the absence of pinging. It is, moreover, known that pinging only occurs in a given angular operating range after the top dead centre. It has therefore already been proposed, for instance in French Patent Application No. 78-33294, to provide an electronic device allowing an angular window to be defined whose ends are positioned in relation to the top dead centre point of each cylinder, this angular window defining the period during which the signals supplied by the vibration detector are processed.

To detect pinging in the above mentioned angular windows, it has already been proposed, for instance in the U.S. Pat. No. 4,012,942, to compare the signal supplied by the vibration detector with a signal corresponding to a base noise programmed in accordance with the vehicle's speed of rotation. The drawback of such a device is that the base noise depends essentially on the operation of the internal combustion engine producing it and thus in order to obtain a convenient determination of the pinging vibrations it would be necessary to have a varying base noise programmed according to the engine type with which the device is intended to cooperate. This constitutes a very considerable drawback because the same device cannot then be used for all the existing engines. Moreover, even in the case of a single engine, the base noise evolves in accordance with the ageing of the engine so that a device of this kind, if capable of providing a suitable result with a new engine for which it had been pre-set, will no longer give a suitable result when the engine has aged after a certain time of use.

It has also been proposed in French Pat. No. 2,144,981 to measure the base noise of an engine in a period which is known not to produce any pinging, to store a signal corresponding to this base noise and then to compare that stored signal with the signal supplied by the detector to detect the possible occurrence of pinging. This device has, in relation to that of the U.S. Pat. No. 4,012,942, the advantage that it may be used in the same conditions irrespective of the engine type and state of ageing of a given engine with which it cooperates. Yet, this device has an important drawback because the recording of the base noise is effected at an instant of operation which is different from the one when the pinging may occur; now the base noise in the operation of an internal combustion engine is not constant during the working cycle so that such a device is not entirely satisfactory.

It has already been proposed in French Patent Application No. 79-04707 to determine the occurrence of pinging by comparing, solely in the angular range of the operating cycle when pinging is capable of occurring, on the one hand the signal supplied by the vibration detector and on the other hand a signal depending on the mean value of the preceding one, this mean value being taken during an adequate period before the considered period of investigation. This type of comparison is altogether satisfactory since it is solely effected in the angular range where pinging can occur and since the vibration level corresponding to pinging is far greater than the vibration level in the absence of pinging.

Yet in all the preceding devices, the signal supplied by the vibration detector, if it is investigated in well-defined angular windows, is never allocated explicitly to one or the other of the engine cylinders. When this signal is compared with a predetermined threshold representing the base noise, one is always concerned with an average base noise corresponding to the average operation of the engine for a given speed of rotation. When the signal of the detector is compared with a mean value of the same signal, taking into account the functioning over a certain number of previous cycles, the mean value takes the operation of all the cylinders into account. It will therefore be seen that in all of the preceding devices, pinging is detected by comparing a signal relating to a definite cylinder even if it is not identified with a signal taking into account the operation of all the cylinders of the engine. This does, of course, give rise to some inaccuracy in the detection method because, on the one hand the respective base noises relating to the operation of the individual cylinders are not necessarily the same, and on the other hand the single vibration detector cannot be identically positioned in relation to each of the cylinders and therefore does not have the same receptivity to the base noise relating to each one of these cylinders.

The object of the present invention is therefore to propose an ignition timing device allowing the above mentioned drawback to be overcome. According to the invention, the signal supplied by a vibration detector for a given cylinder, within the angular window where the pinging is capable of occurring for the cylinder, is exclusively compared with a signal relating to the preceding operation of the same engine cylinder. In this way it is clear that the positioning of the detector in relation to the various engine cylinders is no longer of importance because the signals being compared always correspond to the operation of the same cylinder. Moreover, the inaccuracy due to the difference which may exist in the base noise supplied by each cylinder in the absence of any pinging is also eliminated. Thus the invention allows the accuracy of the pinging detection to be improved.

The reference signal used in accordance with the invention may, as proposed in French Patent Application No. 70-04707, be a mean value of the signals corresponding to the operation of the considered cylinder during the angular windows of a certain number of previous cycles. However since, according to the invention, the compared signals relate to the same cylinder, and since the pinging is not established progressively, and since the vibration level in a cylinder is either (a) normal or (b) considerably higher at the incidence of pinging, it is no longer necessary to compare a signal with the mean value relating to several preceding operating cycles and it is sufficient to compare the signal supplied by the vibration detector with the value of this signal during the angular window of the preceding cycle of the same cylinder. Since the vibration level is considerably higher in the case of pinging than in the case of normal operation it is possible, in the interests of an accurate determination, to assign a multiplying factor to the reference signal before it is compared with the signal supplied by the detector. In other words, according to the invention, the signal supplied by the vibration detector during an angular window of a given cylinder is stored, assigned a multiplying factor and then compared with the signal supplied by the same detector during the following angular window of the same cylinder. The advantage of this way of operating is obvious on a practical level since, if multiplication of the circuits is to be avoided, pinging determination of the detector, cylinder by cylinder, requires working on a digital and not on an analog basis. If one is working on a digital basis, it is relatively difficult to obtain an average value relating to a certain number of preceding signals whilst it is very easy to store the preceding value of the signal supplied by the detector during the angular window of a given engine cylinder.

Moreover, the invention does allow considerable additional progress to be made by reason of the fact that the detection of the occurrence of pinging is effected cylinder by cylinder and not in an intermediate fashion for any one of the cylinders of the engine. It is in fact known that during the operation of an engine pinging may occur only in the case of certain cylinders of the engine and not in the case of the others. In all the previously known devices when any one of the engine cylinders caused the pinging phenomenon to appear, the ignition timing advance was reduced for the whole set of the cylinders.

Now it is known that one loses approximately 1% of the engine output per degree of reduction of the ignition timing advance (starting from the optimum value of the latter). It will therefore be seen that if, as was the previous conventional procedure, the ignition timing advance is recuced by 5 degrees when pinging is detected in one of the engine cylinders, the total engine output is reduced by approximately 5%. This reduction is perfectly justified for the one cylinder where the pinging has occurred, but it is totally unjustified in the case of the other cylinders. In accordance with the invention, since the pinging detection is effected on a cylinder by cylinder basis with the identification of the cylinders concerned, it is possible to exercise control selectively on the cylinder where the pinging occurs, without affecting the other cylinders. In other words, the ignition timing advance may be reduced in the cylinder where the pinging occurs without any modification of the ignition timing advance in the other cylinders. Of course this procedure presupposes the existence of an electronic ignition system in which the primary circuit of the ignition coil is open or closed by a signal emitted by a circuit comprising on the one hand means for computing the ignition timing advance, and on the other hand the means responsive to the data from the vibration detector which identifies the pinging. This electronic circuit may advantageously comprise a microprocessor.

The object of the present invention is therefore a new industrial product constituted by an ignition timing device for an internal combustion engine, in particular for motor vehicles supplying for each cylinder an ignition signal staggered in relation to the top dead centre of the cylinder in question in accordance with at least one parameter, the set of parameters P taken into consideration including the engine speed or rotation, this device being associated with a pinging detector comprising at least one vibration detector fixed on the engine and an electronic circuit intended to process the data supplied by the said detector to control the ignition timing, the said circuit taking the said data into account only in the angular windows corresponding to a fraction of the cycle of each cylinder when the pinging can occur. The invention has the improvement that the signal I supplied by the vibration detector in the angular window relating to an engine cylinder is compared with a threshold S obtained on the basis of previous data supplied by the said detector in the corresponding angular window relating to the same engine cylinder, the comparison controlling a modification of the ignition timing if pinging has occurred in the cylinder in question.

In a preferred embodiment, the command for a modification of the ignition timing is effected when signal I exceeds a threshold S, the said signal I being an increasing function of the vibration level to which the detector is subjected; threshold S is obtained solely on the basis of data supplied by the detector during the preceding corresponding angular window of the same cylinder; threshold S is obtained by multiplying signal I supplied by the detector during the preceding angular window of the same cylinder by a factor higher or equal to 1; signal I is obtained by processing the signal supplied by the vibration detector by means of a band pass filter by rectifying the alternating signal obtained and by integrating the rectified signal over the duration of the angular window; the integrated rectified signal is converted into digital data by an analogue/digital converter to constitute signal I; the comparison of signal I and of signal S is effected in a micro-processor and generates a signal R corresponding to an ignition timing retardation which is subtracted from the ignition timing advance determined on the basis of parameters P of the engine operation; the micro-processor receives not only the data coming from the vibration detector but also data coming from a detector determining the angular position, making it possible to determine the top dead centre of each cylinder, and possibly also data coming from a low pressure detector which is sensitive to low pressure in the inlet manifold of the engine, the said micro-processor defining the ignition timing advance and the angular windows intended to cause the vibration detector to operate and supplying the ignition signal; the shift in ignition timing controlled by the device at the onset of pinging only affects the firing of the cylinder during the angular window in respect of which the pinging has been detected; the ignition signal supplied by the micro-processor is addressed to a power stage which controls a transistor opening or closing the power supply of the primary circuit of the ignition coil connected to the sparking plugs of the engine.

In order that the invention may more readily be understood an embodiment thereof is represented in the accompanying drawing and will now be described by way of a purely illustrative and non-restrictive example. In this drawing:

FIG. 1 is a block diagram of an ignition timing device in accordance with the invention; and FIG. 2 shows schematically the means generating retardation signal R, in the micro-processor of the device of FIG. 1.

Referring to FIG. 1 it will be seen that the set of detectors fixed on the internal combustion engine comprising the ignition timing device according to the invention has been disposed above the dashed line 1. In the embodiment described, the engine is a four cylinder, four stroke engine. On the cylinder head, there is fixed a vibration detector 2. The fly wheel of the engine crankshaft incorporates an angular position detector 3 responsive to the top dead centre point of each one of the engine cylinders. On the mixture feed line of the cylinders (for example in the inlet manifold), there is fixed a low pressure detector 4.

The vibration detector 2 emits an alternating signal which passes through an electronic gate 5: gate 5 is open during the angular window where it is known that the pinging phenomenon is capable of occurring for one of the engine cylinders; such an angular window corresponds, for instance, to an angular range extending from 5 degrees after the top dead centre up to 50 degrees after the top dead centre. Outside the above mentioned angular window, gate 5 is closed and does not allow any signal emitted by detector 2 to pass. The output of gate 5 is connected to an amplifier filter 6 which only allows low frequencies (corresponding to the pinging phenomenon) to pass; that is to say only frequencies comprised from 5 to 10 KHz are passed. Thus element 6 constitutes a band pass filter. Band pass filter 6 feeds a rectifier circuit 7 which rectifies all the negative half cycles of the processed signal into positive ones. The rectifier circuit 7 feeds an integrator 8 which integrates the signal it receives during the whole of the period corresponding to the angular window. The output signal of integrator 8 is sent to an analog/digital converter 9 whose output supplies, to the micro-processor which is generally designated 10, digital information which is proportional to the value of the signal supplied by integrator 8.

The micro-processor 10 comprises several functions which are represented by circles in FIG. 1. The first function in micro-processor 10 represented by circle 11 allows an ignition timing retardation signal R to be generated and the principle of this function has been represented in greater detail in FIG. 2. For achieving function 11, micro-processor 10 receives the signal delivered out by converter 9. Micro-processor 10 comprises a second function represented by circle 12; this function allows the angular window to be calculated on the basis of the information supplied by detector 2 which detects the passing at the top dead centre and on the basis of the data supplied by function 13 of the micro-processor which, by processing the signal delivered by detector 3, supplies the information relating to the engine speed of rotation. Function 12 forwards the signals relating to the beginning and end of the angular window to gate 5 to control its opening or closing and it also forwards a zero resetting signal to integrator 8. Micro-processor 10 also comprises the function represented by circle 14 which, on the basis of the data supplied by detector 4 on the one hand and by function 13 on the other hand, generates an ignition timing advance signal A.

Signals A and R are sent to a function of micro-processor 10 which is represented by circle 15: function 15 allows the ignition retardation R to be subtracted from the ignition timing advance corresponding to signal A. Thus at the output of function 15, one obtains the ignition timing shift which will be effectively used for timing the spark in the following cycle of the cylinder in the angular window in respect of which the detection is obtained by detector 2. Function 15 is linked to a function represented by circle 16 and allows the calculation of the charging time of the ignition coil 17 of the device. In other words, function 16 allows the closing of the energising circuit of the primary winding of coil 17 to be controlled and function 15 provides the opening control facility. The output of the micro-processor is connected to a power stage 18 which controls the base of a transistor 19 whose emitter is connected to the earth (negative terminal of the power supply) whereas the collector is connected to one of the ends of the primary winding of coil 17 whose other end is connected to the positive terminal of the power supply. The secondary winding of coil 17 is connected by one of its ends to the positive lead and by its other end to the central terminal of a rotary distributor 20, each one of whose peripheral terminals feeds one of the four sparking plugs 21 of the engine.

The functioning of the device described above is as follows: when a cylinder comes to the top dead centre and arrives in the zone of its operating cycle which corresponds to the angular window wherein pinging may occur, function 12 of micro-processor 10 controls the opening of gate 5. The vibration detector 2 therefore forwards its signal through filter 6 and rectifier 7 to the integrator circuit 8 and, the greater the vibrations the higher the output level of integrator 8. Converter 9 therefore forwards to function 11 of micro-processor 10 digital data whose value is a function of the amplitude of the vibrations sustained by detector 2. Detector 3 controls, via functions 12 and 13, the opening of gate 5 and resets the integrator circuit 8 to zero between two successive angular windows. Function 14 generates signal A on the basis of the data received from detector 4 and function 13.

FIG. 2 shows the operating principle of function 11 of micro-processor 10. The signal received from converter 9 is forwarded to one of the inputs of a multiplexer 22 which is controlled by the output of a comparator 23. The output of multiplexer 22 charges a four unit shift register 24, the number of units of the element corresponding to the number of cylinders of the engine. The output of shift register 24 supplies, via a multiplier circuit 25, one of the inputs of comparator 23 whereas the other input is connected to converter 9. The output of register 24 is also connected to a second input of multiplexer 22.

When a signal arrives from converter 9 it is compared, by means of comparator 23, with the value of the downstream unit of register 24 multiplied by the factor assigned to it by multiplying circuit 25; if the incident signal exceeds the reference signal, the multiplexer 22 is inverted so as to charge the upstream unit of shift register 24 with the information which was previously in the downstream unit of the said element. This type of operation occurs if, starting from a condition where there was no pinging in the cylinder in question, a vibration level detected in this cylinder corresponds to the occurrence of pinging. Thus, in this case, the data stored in register 24 always corresponds to a vibration level obtained in the absence of pinging in the cylinder in question. As is known, the information contained in each one of the four units of the shift register 24 are displaced step by step in the register from the upstream side to the downstream side progressively as fresh information is introduced into the upstream unit. Thus shift register 24 contains in its four units, data corresponding to the vibration levels for each one of the four engine cylinders in the absence of pinging and of the information delivered by converter 9 for a given cylinder of the engine, the signals relating to the normal working of that cylinder in question are stored in the upstream unit of register 24 and the signal relating to the cylinder which will next subsequently be on its ignition stroke is ready for retrieval from the downstream unit of shift register 24.

Comparator 23 controls by means of its output, an element 26. The output of element 26 feeds the upstream unit of another four unit shift register 27. The downstream unit of register 27 is connected to one of the inputs of an element 28 whose other input 28a receives a constant signal. The output of element 28 supplies one of the inputs of element 26 whose other input 26a also receives a constant signal. The constant signals received on inputs 26a and 28a of elements 26 and 28 correspond in the case of element 26 to an ignition timing retardation of a predetermined value, for example 5°, and in the case of element 28 to a fixed fraction of the above mentioned ignition timing retardation.

When element 26 receives from comparator 23 a signal indicating that there is no pinging in the cylinder whose cycle is in the angular observation window, the output signal from element 28 passes through element 26 and is restored in the upstream unit of the four unit shift register 27. This signal corresponds to a zero ignition timing retardation since the output of element 28 can never be negative and since element 28 tends, at each operation, to subtract the constant value supplied on its terminal 28a from the value arriving on the other terminal. If, on the other hand, comparator 23 supplies a signal corresponding to the incidence of pinging in the cylinder under investigation, while previously there had not been any pinging in that cylinder, element 26 has at its output the greater signal obtaining on its two input terminals: if the signal coming from element 28 is assumed to be zero, it is the constant predetermined signal coming from terminal 26a which is forwarded to the upstream unit of shift register 27. This signal corresponds to a maximum ignition timing retardation of 5° for instance and it is stored in the upstream unit of shift register 27. The content of this unit is transferred step by step towards the downstream unit of register 27 and it is retrieved in this downstream unit when the same cylinder is again on the ignition stage of its cycle.

It will therefore be seen that if pinging occurs in a particular cylinder in the course of a cycle, the signal R corresponding to the ignition (i.e. spark) in that cylinder during the next following cycle has a value which corresponds to the maximum envisaged ignition retardation i.e. 5°, and is superimposed on the conventional timing advance.

In this case, it is known that, in the course of the following cycle, if the value of 5° has been suitably chosen, there will not be any pinging in that cylinder. Element 26 will therefore allow the output value of the signal supplied by element 28 to pass to its output. Now, this signal corresponds to the maximum retardation less a value corresponding to the constant signal supplied on terminal 28a, (this value corresponding to a fraction of the maximum retardation, for example a quarter). Therefore, the data stored in the upstream unit of shift register 27 corresponds to three quarters of the maximum retardation value. During the following cycle, this information is retrieved in the downstream unit of shift register 27. If pinging still occurs, the maximum retardation value is then reimposed, thanks to the functioning of element 26. If on the other hand there is now no pinging the element 28 reduces again the ignition timing retardation value and the corresponding information stored in the upstream unit of shift register 27. It will therefore be seen that by means of this operation, the ignition timing retardation value applied for a cylinder where pinging is occurring is limited so that the drop in output of the cylinder due to the imparted ignition timing retardation, should always be reduced as far as possible.

The ignition timing retardation signal R supplied by shift register 27 is together with the theoretical timing advance signal supplied to function 15 of micro-processor 10 so as to control, at the appropriate moment, the opening of the primary circuit of winding 17.

It will therefore be seen that the device described above makes it possible to control the value of the ignition timing advance of each engine cylinder in accordance with the pinging detection effected during the angular window of the preceding cycle of the same cylinder. It is clear that if a single cylinder is subject to pinging, for instance because of the presence of a hot spot, the ignition timing advance may thus be reduced solely for this cylinder without modifying the ignition timing advance of the other cylinders, and this allows the overall output of the internal combustion engine to be greatly improved whilst avoiding the adverse mechanical effects of pinging.

It shall be duly understood that the embodiment described above is in no way restrictive and may give rise to any desirable modifications without departing thereby from the scope of the invention as defined in the following claims:

I claim:

1. In an ignition timing device for an internal combustion engine, supplying an ignition signal for each cylinder staggered in relation to the top dead centre of the cylinder in question in accordance with at least one parameter, the set of parameters taken into consideration including the speed of rotation of the engine, this device being connected to a pinging detector comprising at least one vibration detector fixed on the engine and an electronic circuit designed to process the data supplied by the said detector to control the ignition timing, the said circuit taking the said data into account only in the angular window corresponding to that fraction of the cycle of each cylinder during which pinging can occur, the improvement comprising
(a) means for deriving a threshold signal value on the basis of the data supplied by the said detector in the said angular window of a cycle of a cylinder,
(b) comparison means for comparing the signal supplied by the vibration detector in the angular window of a subsequent cycle of said cylinder of the engine with said derived threshold value for the same cylinder of the engine, and (c) means responsive to the said comparison means for controlling a modification of the ignition timing if pinging has occurred in the cylinder in question, and wherein said means for deriving a threshold value is effective to derive said value solely on the basis of the data supplied by said vibration detector during the corresponding angular window of the last preceding cycle of the same cylinder.

2. A device according to claim 1, wherein said threshold deriving means is effective to derive said threshold value by multiplying the signal supplied by the vibration detector during the corresponding angular window of the last preceding cycle of the same cylinder by a factor of no less than 1.

3. A device according to claim 1 or claim 2, including a band pass filter means, signal rectifying means and signal integrating means connected between said vibration detector and said comparison means, and effective to filter and rectify the alternating signal from said vibration detector and to integrate the rectified signal during the duration of the angular window, before said comparison is made.

4. A device according to claim 3, and further including analog-digital converter means effective to convert the rectified and integrated signal into digital information before comparison.

5. A device according to claim 2, and including band pass filter means, signal rectifying means, signal integrating means and analog-digital converter means connected between said vibration detector and said comparison means, and effective to filter, to rectify and to integrate the signal from said vibration detector and to convert the rectified and integrated signal into digital form before comparison, and wherein said comparison means comprises a micro-processor which generates a signal R corresponding to an ignition timing retardation which is subtracted from the said staggered ignition timing advance signal determined on the basis of the set of parameters of the engine operation including engine speed.

6. A device according to claim 5, and further including angular position detector means responsive to the top dead centre position of each cylinder; and wherein said micro-processor is connected to receive not only the signal from the vibration detector but also information from said angular position detector means.

7. A device according to claim 6, and further including a low pressure detector sensitive to low pressure in the fuel/air inlet of said engine, and wherein said microprocessor defines the ignition timing advance and the angular windows during which said vibration detector means is to operate, and further supplies the ignition signal.

8. A device according to claim 1 or 2, wherein said means responsive to the comparison for controlling the modification of the ignition timing in the case of pinging is effective to control solely the firing of the same cylinder during whose corresponding angular window on the previous cycle pinging has been detected.

9. A device according to claim 6, wherein said means responsive to the comparison for controlling the modification of the ignition timing in the case of pinging is effective to control solely the firing of the same cylinder during whose corresponding angular window on the previous cycle pinging has been detected, and including a transistor which opens and closes the power supply of the primary circuit of the ignition coil connected to sparking plugs of the engine, a power stage controlling said transistor, and means for supplying to said power stage the ignition signal supplied by the micro-processor.

* * * * *